(12) United States Patent
Evans et al.

(10) Patent No.: US 7,069,340 B1
(45) Date of Patent: Jun. 27, 2006

(54) SYSTEM AND METHOD FOR OPERATING A TRANSMITTER TO MULTICAST DATA BLOCKS OVER A NETWORK

(75) Inventors: Paul Andrew Evans, Ipswich (GB); Robert John Briscoe, Ipswich (GB); Steven Rudkin, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/763,325

(22) PCT Filed: Sep. 17, 1999

(86) PCT No.: PCT/GB99/03114

§ 371 (c)(1),
(2), (4) Date: Feb. 21, 2001

(87) PCT Pub. No.: WO00/18068

PCT Pub. Date: Mar. 30, 2000

(30) Foreign Application Priority Data

Sep. 18, 1998 (EP) .................................. 98307623

(51) Int. Cl.
*G06F 15/16* (2006.01)
(52) U.S. Cl. ....................................... 709/245; 709/238
(58) Field of Classification Search ................ 709/207, 709/245, 238; 370/390
See application file for complete search history.

(56) References Cited

U.S. PATENT DOCUMENTS

| | | | | |
|---|---|---|---|---|
| 4,792,947 A | * | 12/1988 | Takiyasu et al. | 370/452 |
| 5,321,693 A | * | 6/1994 | Perlman | 370/403 |
| 5,331,637 A | * | 7/1994 | Francis et al. | 370/408 |
| 5,608,726 A | * | 3/1997 | Virgile | 370/401 |
| 5,907,793 A | * | 5/1999 | Reams | 725/122 |
| 6,147,992 A | * | 11/2000 | Giroir et al. | 370/390 |

FOREIGN PATENT DOCUMENTS

EP 0854604 A1 7/1998

OTHER PUBLICATIONS

Martin et al, "Overview of the NBBS Architecture", IBM Systems Journal, vol. 34, No. 4, 1995 (attached copy downloaded from www.google.com).
L. Delgrossi et al, "Internet Stream Protocol Version 2 (ST2) Protocol Specification—Version ST2+", Internet Engineering Task Force Request for Comments (RFC) 1819, Aug. 1995 (especially section 4.5.3.).
Tanenbaum, "Computer Networks", 3rd Edition, 1996, p. 58 and pp. 489-492.

* cited by examiner

*Primary Examiner*—Le Hien Luu
(74) *Attorney, Agent, or Firm*—Nixon & Vanderhye, P.C.

(57) ABSTRACT

A packet network is arranged into a hierarchy, having one organization-level portion (CS, P, R2) and three site-level portions (S1, S2, S3). By using forwarding computers and assigning multicast addresses in respect of each portion, the total number of multicast addresses required to send multicast messages to all possible subsets of potential recipients is reduced. This alleviates routers in the network of the burden associated with storing and processing a large amount of multicast addresses.

12 Claims, 7 Drawing Sheets

| Members of Set (organisation level) | IP address | Subjects subscribed to |
|---|---|---|
| C1,C2,C3 | 229.274.1.27 | golf |
| C1,C2 | 229.274.1.28 | pool, hockey |
| C1,C3 | 229.274.1.29 | wrestling |
| C2,C3 | 229.274.1.30 | basketball |
| C1 | 147.144.101.2 | skiing, rugby, cycling, weightlifting |
| C2 | 147.144.102.2 | swimming, fishing, tennis |
| C3 | 147.144.103.2 | athletics, boxing, badminton, horse-riding, cricket, squash, windsurfing, yachting, gymnastics |

(subject matter in organisation-level forwarding computer P)

| Members of Set (site level) | IEEE 802 address |
|---|---|
| H1,H2,H3 | C000:0000:0001 |
| H1,H2 | C000:0000:0002 |
| H1,H3 | C000:0000:0003 |
| H2,H3 | C000:0000:0004 |
| H1 | 0400:0000:0001 |
| H2 | 0400:0000:0002 |
| H3 | 0400:0000:0003 |

(directory in site-level forwarding computer C1)

Fig.2B.

| Members of Set | IP address |
|---|---|
| C1,C2,C3 | 229.274.1.27 |
| C1,C2 | 229.274.1.28 |
| C1,C3 | 229.274.1.29 |
| C2,C3 | 229.274.1.30 |
| C1 | 147.144.101.2 |
| C2 | 147.144.102.2 |
| C3 | 147.144.103.2 |

(directory in organisation-level forwarding computer P)

Fig.4A.

| Members of Set (site level) | IEEE 802 address | Subjects subscribed to |
|---|---|---|
| H1,H2,H3 | C000:0000:0001 | none |
| H1,H2 | C000:0000:0002 | none |
| H1,H3 | C000:0000:0003 | none |
| H2,H3 | C000:0000:0004 | none |
| H1 | 0400:0000:0001 | pool |
| H2 | 0400:0000:0002 | none |
| H3 | 0400:0000:0003 | none |

(subject data in site-level forwarding computer C1)

Fig.4B.

| Members of Set (organisation level) | IP address | Subjects subscribed to |
|---|---|---|
| C1,C2,C3 | 229.274.1.27 | none |
| C1,C2 | 229.274.1.28 | none |
| C1,C3 | 229.274.1.29 | none |
| C2,C3 | 229.274.1.30 | none |
| C1 | 147.144.101.2 | pool |
| C2 | 147.144.102.2 | none |
| C3 | 147.144.103.2 | none |

(subject table in organisation-level forwarding computer P)

Fig.4C.

| Members of Set (site level) | IEEE 802 address | Subjects subscribed to |
|---|---|---|
| H1,H2,H3 | C000:0000:0001 | none |
| H1,H2 | C000:0000:0002 | pool |
| H1,H3 | C000:0000:0003 | none |
| H2,H3 | C000:0000:0004 | none |
| H1 | 0400:0000:0001 | none |
| H2 | 0400:0000:0002 | none |
| H3 | 0400:0000:0003 | none |

(subject table in site-level forwarding computer C1)

Fig.5A.

| Members of Set (site level) | IEEE 802 address | Subjects subscribed to |
|---|---|---|
| H1,H2,H3 | C000:0000:0001 | pool |
| H1,H2 | C000:0000:0002 | skiing |
| H1,H3 | C000:0000:0003 | none |
| H2,H3 | C000:0000:0004 | weight-lifting; wrestling |
| H1 | 0400:0000:0001 | cycling; golf |
| H2 | 0400:0000:0002 | rugby |
| H3 | 0400:0000:0003 | hockey |

(subject table in site-level forwarding computer C1)

Fig. 5B.

| Members of Set (site level) | IEEE 802 address | Subjects subscribed to |
|---|---|---|
| H4,H5,H6 | C000:0000:0011 | swimming |
| H4,H5 | C000:0000:0012 | fishing,pool |
| H4,H6 | C000:0000:0013 | golf |
| H5,H6 | C000:0000:0014 | none |
| H4 | 0400:0000:0011 | tennis |
| H5 | 0400:0000:0012 | basketball |
| H6 | 0400:0000:0013 | hockey |

(subject table in site-level forwarding computer C2)

Fig. 5C.

| Members of Set (site level) | IEEE 802 address | Subjects subscribed to |
|---|---|---|
| H7,H8,H9 | C000:0000:0021 | athletics |
| H7,H8 | C000:0000:0022 | boxing |
| H7,H9 | C000:0000:0023 | none |
| H8,H9 | C000:0000:0024 | badminton |
| H7 | 0400:0000:0021 | horse-riding; cricket; squash |
| H8 | 0400:0000:0022 | basketball; windsurfing; wrestling; yachting |
| H9 | 0400:0000:0023 | golf; gymnastics |

(subject table in site-level forwarding computer C3)

Fig.6.

| Members of Set (organisation level) | IP address | Subjects subscribed to |
|---|---|---|
| C1,C2,C3 | 229.274.1.27 | golf |
| C1,C2 | 229.274.1.28 | pool, hockey |
| C1,C3 | 229.274.1.29 | wrestling |
| C2,C3 | 229.274.1.30 | basketball |
| C1 | 147.144.101.2 | skiing, rugby, cycling, weightlifting |
| C2 | 147.144.102.2 | swimming, fishing, tennis |
| C3 | 147.144.103.2 | athletics, boxing, badminton, horse-riding, cricket, squash, windsurfing, yachting, gymnastics |

(subject matter in organisation-level forwarding computer P)

SYSTEM AND METHOD FOR OPERATING A TRANSMITTER TO MULTICAST DATA BLOCKS OVER A NETWORK

BACKGROUND

1. Technical Field

The present invention relates to a method of operating a transmitter to multicast data blocks over a network.

2. Description of Related Art

In network terminology, sending a data block (i.e. a message, packet, frame or the like) across a network to a single recipient is known as unicasting. Sending a data block to all receivers connected to a network is known as broadcasting. Sending a data block to a set of recipients that form a subset of all receivers connected to a network is referred to as multicasting. Such a set of recipients is known as a multicast group.

In broadcast networks (e.g. nearly all Local Area Networks), all receivers receive any data block placed the network. Each receiver has a network interface card that identifies frames that are intended for that receiver. In order to identify which multicast data blocks are intended for that receiver, the network interface card must store an indication of each multicast address for which the receiver is a recipient.

In networks comprising switching nodes interconnected by point-to-point links, each switching node must store, for each multicast group, an indication of which of the links connected to it lead toward members of the multicast group.

In both types of networks therefore, the amount of memory required in network components increases with the number of multicast addresses in use.

Conventional use of multicast networks often results in the use of more multicast addresses than is necessary. Furthermore, the amount of traffic generated in passing one or more multicast messages across the network is often unnecessarily high.

European Patent Application EP 0 854 604 A1 discloses a fast packet switching network that provides interconnection for peer networks that support group addressing.

Although the use of multicasting is currently at a level where the above problems do not impact heavily on network performance, a rapid rise in the use of multicast is likely to take place over the next few years. This means that there is a need to provide a more efficient way of using networks that provide a multicast capability.

BRIEF SUMMARY OF EXEMPLARY NON-LIMITING EMBODIMENTS

According to a first aspect of the present invention, there is provided a method of operating a transmitter of data blocks connected via a network to a plurality of receivers of said data blocks, said method comprising:

finding the set of recipients to which a data block is to be sent; and transmitting said data block over said network to said set of recipients;

said method being characterised by:

said network being multicast-capable;

said transmitter having access to one or more directories listing sets of recipients selected from said receivers and corresponding multicast addresses for use in said multicast-capable network;

examining said one or more directories to find respective one or more multicast addresses corresponding to the set of recipients found in said examining step;

addressing one or more data blocks to the respective multicast addresses found in said examining step.

By having one or more directories that list possible selections of recipients and corresponding multicast addresses, multicast data blocks can be addressed based on the set of recipients to which it is found the data block is to be sent. This leads to the process of multicasting a data block being more easily adaptable to the requirements of different users.

For groups with only one member, the directories can provide a unicast address instead of a multicast address.

To give an example, in some embodiments of the present invention, said finding step comprises:

a) receiving one or more indications that an earlier data block addressed to a selected set of recipients was not successfully received by one or more of said recipients; and b) analysing said indications to find the subset of said selected set of recipients that did not successfully receive said earlier data block;

wherein said examining step involves examining said one or more directories to find the multicast address corresponding to said subset of recipients.

By finding the set of recipients that require re-transmission of the data block, and then finding from the one or more directories the multicast address that corresponds to that set of recipients, the re-transmission can easily be directed only towards those recipients that failed to receive the earlier data block. This results in less load being placed on the network than would occur in accordance with conventional methods where the data block is re-transmitted to the same multicast address as before once one or more recipients have indicated that they have not received the data block.

To give another example of the improved adaptability provided by operating the transmitter in accordance with the present invention, in some embodiments said finding step involves:

a) determining that a general data block is to be sent to a selected plurality of sets of recipients; and b) unifying said plurality of sets of recipients to find a unified set of recipients;

wherein said examining step involves examining said one or more directories to find from said address data the multicast address which corresponds to said unified set.

In this case only one multicast message need be sent across the network, as opposed to the plurality of multicast messages that would have to be sent using a conventional method.

It is to be expected that 'push' news services, Publish and Subscribe services and the like will soon migrate to the use of multicasting. 'Push' news services normally allow a user to select subjects of interest. One way of achieving the bandwidth savings offered by the use of multicast (whilst allowing a user to be selective as to which subjects he received) would be to allocate a multicast address to each subject. However, given the large number of possible subjects this method would result in the components of the network having to handle a large number of multicast addresses.

To address this problem, in a further embodiment of the present invention, said transmitter further has access to type data listing data block type identifiers and corresponding sets of recipients, and said finding step involves:

a) finding a type identifier associated with said data block; and b) examining said type data to find the set of recipients associated with said type identifier.

The transmitter might update the type data in response to a request from a recipient to be sent data blocks containing a given type identifier, or in response to a request not to receive any further data blocks containing that type identifier.

The data block type identifier might, for example, indicate to which subject the information carried in the data block relates. In conventional methods of operating a transmitter to use a multicast-capable network, a one-to-one subject-to-multicast address mapping is used. However, it will be seen that the above embodiment enables a many-to-one subject-to-multicast address mapping to be used instead. In networks where the number of selections of recipients is less than the number of subjects, the number of multicast addresses that must be handled by the network is reduced.

It is even possible to utilise the present invention to reduce the number of multicast addresses that must be handled by a network where the number of possible sets of recipients is very high (it will be realised that the number of sets of recipients grows exponentially with the number of receivers).

One way of achieving this is to divide the recipients into groups and provide a separate directory for each group. The number of multicast addresses required then grows exponentially with the number of receivers in each group, rather than growing exponentially with the number of receivers connected to the network.

Another way of achieving this is to provide, in accordance with a second aspect of the present invention, a method of operating an internetwork, said internetwork comprising:

a first level source of data blocks connected via a first level network to a plurality of first level network receivers which include a plurality of second level transmitters in turn connected via respective second networks to respective pluralities of second level network receivers, said method comprising the steps of:

operating said first transmitter to transmit data blocks over said first network; and operating each of said second level transmitters to forward data blocks over the corresponding second level network said method being characterised in that:

said second level transmitters have access to respective second level network directories, each second level network directory listing data block type identifiers and corresponding multicast addresses for the second level network to which the directory relates; and further operating said first transmitter to include a data block type identifier in each data block;

said second level transmitters forwarding said data blocks by:

a) extracting said type identifier from a data block received from the first transmitter;

b) examining the appropriate second level network directory to find the second level network multicast address corresponding to said type identifier;

c) addressing said data block to said second level network multicast address; and d) transmitting said data block over said second level network.

The term internetwork is used here to mean a plurality of interconnected networks (which themselves therefore form a larger network). Here the networks are arranged into a hierarchy, the connections between the first and second level networks being made by respective second level transmitters. It will be realised that the second level network directories are similar to the group directories mentioned above and result in a corresponding reduction in the number of multicast addresses that must be handled in the larger network.

In hierarchical embodiments of the present invention one or more of the smaller networks can be operated in accordance with one or more of the above embodiments.

In embodiments of the second aspect of the present invention, the transmitter at one level of the hierarchy (upper transmitter) places a data block type identifier in each data block that it transmits—the transmitter at the next level down in the hierarchy (the lower transmitter) is provided with access to a directory which sets out the multicast addresses associated with each data block type identifier. On receiving a data block from the upper transmitter, the lower transmitter reads the data block type identifier, finds the multicast address associated with that data block type identifier, re-addresses the data block accordingly, and forwards the data block across its network. The hierarchy can have any number of levels.

In a hierarchical arrangement a request from a recipient to be sent data blocks of a particular type need only travel up the hierarchy as far as the intermediate transmitter that already receives data blocks of that type. This advantageously reduces network traffic.

Those skilled in the art will realise that where the smaller networks operate in accordance with the Internet Protocol suite, administrative scoping (a technique which limits the nodes through which a multicast message may pass) can be used to enable the re-use of multicast addresses in separate smaller networks, thereby decreasing further the number of multicast addresses that need to be handled by the larger network.

By having the transmitters intermediate the smaller networks cache data blocks for a predetermined length of time, re-transmission of the data block can be limited to the smaller network in which the transmission failure occurred. Similarly, flow-control can be restricted to a smaller network that is experiencing congestion.

It will be realised that transmitters at all levels of the hierarchy can be provided with a directory listing multicast addresses for the smaller networks they transmit data blocks over.

Thus, according to a third aspect of the present invention, there is provided a method of operating a packet network to transmit a plurality of packets to respective different subsets of possible recipients, said network comprising a plurality of interconnected nodes, said method comprising and being characterised by the steps of, for one or more subnetworks of the network, assigning a common local multicast address for use in said subnetwork to packets which are destined for different subsets of possible recipients but which share a subset of forwarding nodes within said subnetwork.

According to a fourth aspect of the present invention, there is provided a data block forwarding apparatus operable to forward data blocks received from a first network over a second network to a set of second network recipients selected from a plurality of second network receivers, said apparatus comprising:

an input connectable to said first network to receive data blocks;

an output connectable to said second network;

one or more processors;

a program store storing instructions executable by said one or more processors to forward the data block via said output over said second network;

said data block forwarding apparatus being characterised by:

said received data blocks containing a data block type identifier;

a forwarding database store storing data representing data block type identifiers and corresponding sets of recipients;

a directory store storing data representing sets of recipients and corresponding multicast addresses; and said set of instructions being executable to forward the data block by:

a) reading said data block type identifier from a data block received from said first network;

b) examining said forwarding database store to find the set of recipients corresponding to said data block type identifier;

c) examining said directory store to find the multicast address associated with the set of recipients found in step b); and d) re-addressing said data block to the multicast address found in step c).

Such apparatus provides an transmitter intermediate two levels of the hierarchy mentioned above.

There now follows, by way of example only, a description of specific embodiments of the present invention. The description is to be read in conjunction with the accompanying drawings, in which:

DETAILED DESCRIPTION OF EXEMPLARY NON-LIMITING EMBODIMENTS

A corporate intranet (FIG. 1) comprises a central site area network (CS) which includes an IEEE 802.3 local area network L1 to which a sports news computer N, an organisation-level application packet forwarding computer P and a gateway router R1 are connected. The gateway router R1 is also connected to the Internet and an Asynchronous Transfer Mode (ATM) network A.

Figure 1:
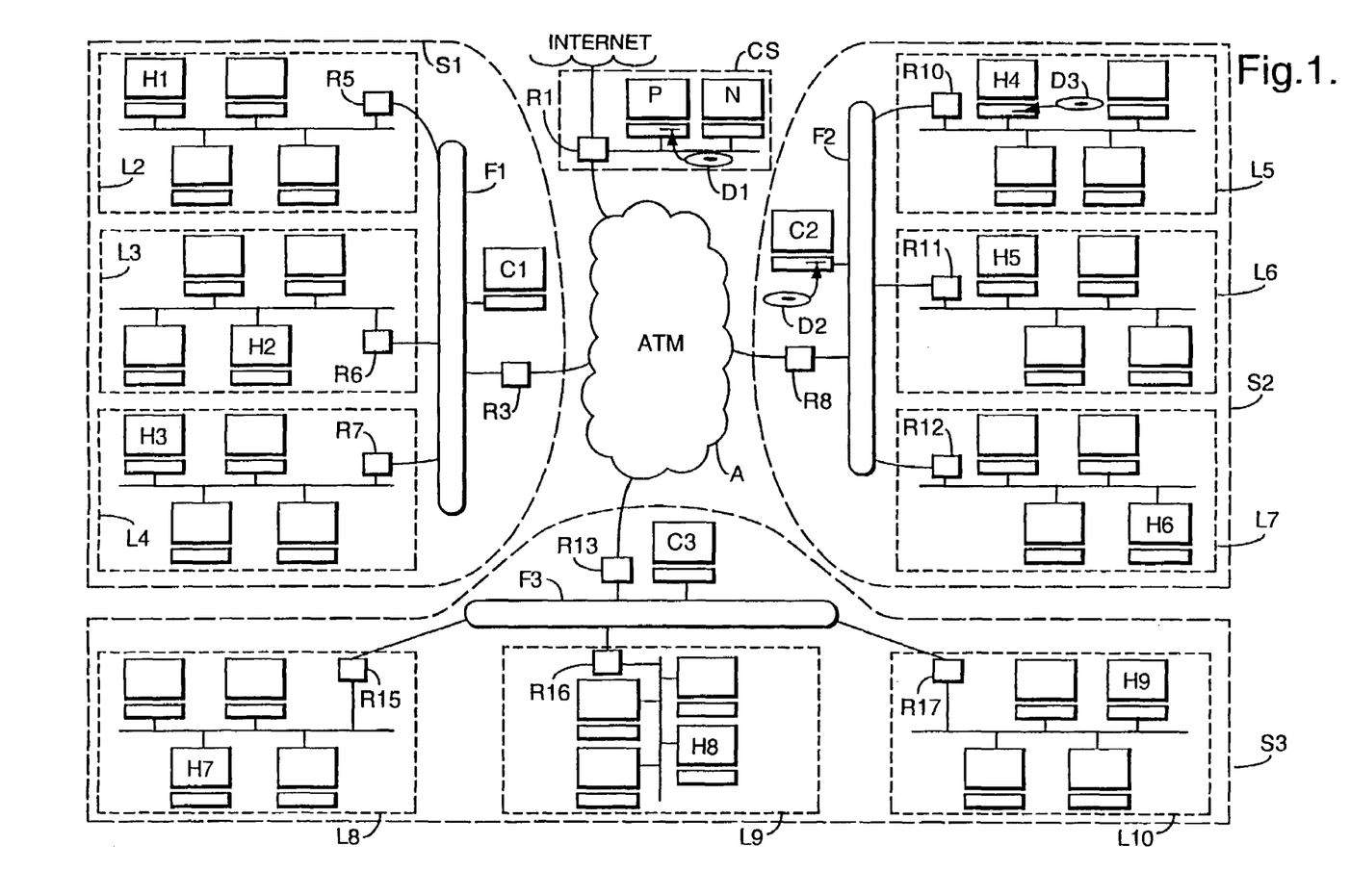
FIG. 1 is a schematic view of an intranet.

The ATM network A connects the gateway router R1 to three site area ingress routers (R3, R8, R13). Each of the three site area ingress routers (R3, R8, R13) is also connected to a respective one of three site-level internetworks. Each site level internetwork comprises a Fibre Distributed Data Interface (FDDI) backbone local area network (F1,F2, F3) which is connected by three building routers (R5 to R7; R10 to R12; R15 to R17) to three respective IEEE 802.3 building local area networks (L2 to L4, L5 to L7 and L8 to L10). Also connected to the FDDI network (F1 to F3) is an application layer packet forwarding computer (C1, C2, C3).

Each building area network (L2 to L4, L5 to L7 and L8 to L10) is also connected to a number of personal computers (PCs).

The sports news computer N at the organisation's central site includes a database containing a number of news articles about various sports. These news articles are updated every few hours.

One PC (H1 to H9) in each of the building area networks (L2 to L10) is designated as a news reader PC.

Figure 2A:
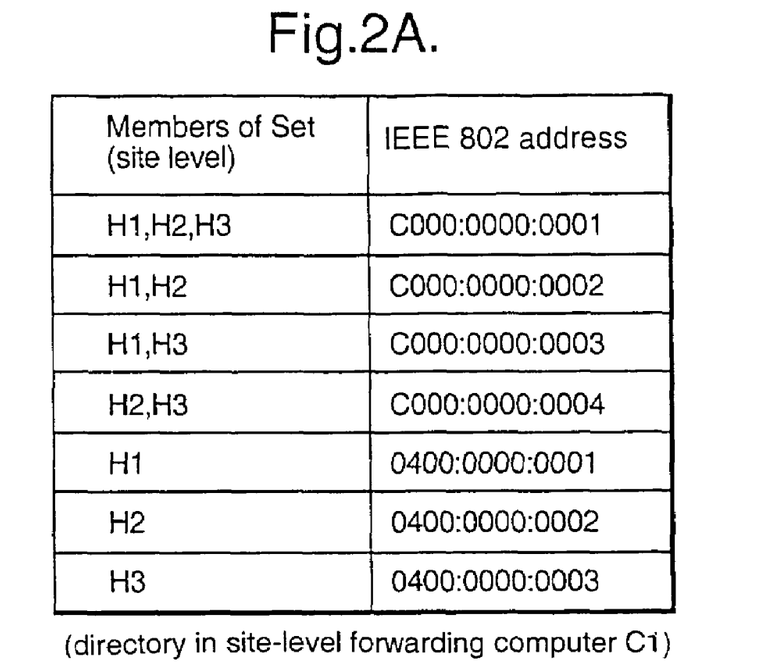
FIGS. 2A and 2B show multicast address allocations for subsections of the intranet.

In configuring the intranet, each of the application layer packet forwarding computers (C1, C2, C3) is manually configured with a site area multicast directory (FIG. 2A). The directory lists possible sets of recipients (left-hand column) and corresponding IEEE 802 addresses (right-hand column). IEEE 802 addresses can be forwarded over both the FDDI network (F1 to F3) and the building area IEEE 802.3 local area networks (L2 to L10). Those skilled in the art will realise that the building routers (R5 to R7; R10 to R12; R15 to R17) are therefore acting as bridges in the present embodiment.

Further configuration involves the network interface cards of the news reader hosts H1 to H9 being configured to ensure that frames having addresses which relate to sets of recipients that include that host are passed from the network interface card to the host itself. For example (see FIG. 2A), the network interface card of news reader host H1 which is present in the sets (H1,H2,H3), (H1,H2), (H1,H3) and (H1) is configured to forward frames addressed to IEEE 802 addresses C000:0000:0001, C000:0000:0002, C000:0000: 0003 (which those skilled in the art will recognise as multicast addresses) and also unicast address 0400:0000: 0001.

Similar procedures are carried out in relation the other site area internetworks (S2, S3).

The next stage in the configuration procedure is to supply a set-to-IP address conversion table to the organisation level packet forwarding computer P. This table is similar to that (FIG. 2A) supplied to each of the site-level forwarding computers (C1, C2, C3), but the sets in this table are sets of site-level forwarding computers (C1,C2,C3) rather than sets of news reader PCs (H1 to H9). Also IP addresses are used since the ATM network A is unable to forward IEEE 802.3 frames. One possible example of the contents of the set-to-IP address conversion table stored in the organisation-level forwarding computer P is shown in FIG. 2B.

Figure 2B:
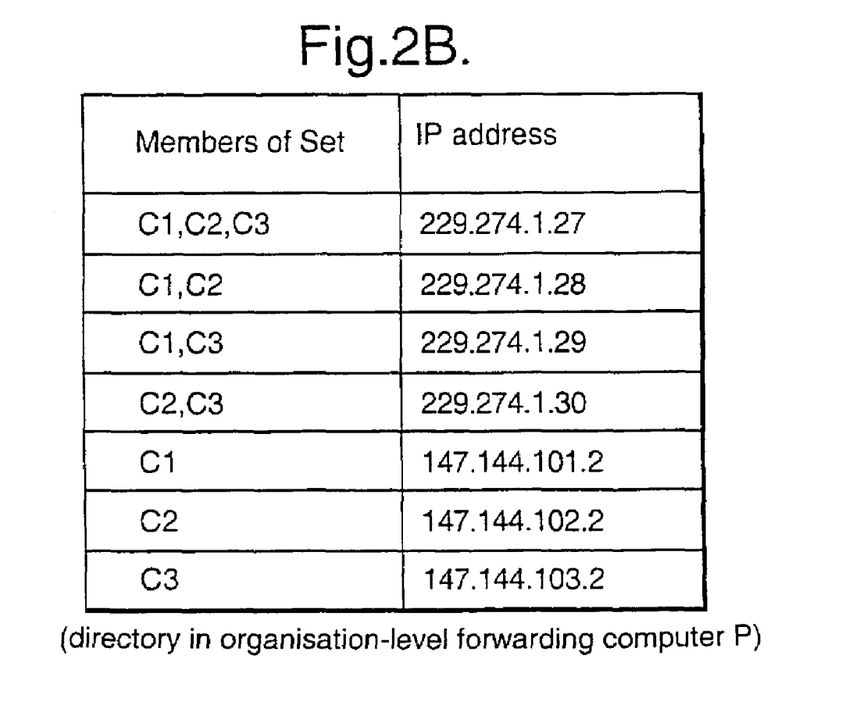

Further, each site area ingress router (R3,R8,R13) is configured to unicast packets having an appropriate one of the addresses in FIG. 2B to the site-level forwarding computer (C1,C2,C3). For example, site area ingress router R8 is configured to send packets having one of the first, second, fourth or fifth addresses shown in FIG. 2B to the site-level forwarding computer C2.

Those skilled in the art will realise that this will result in gateway router R1 having four news application-related multicast addresses in its multicast routing table. Each entry will include a mapping from the IP address to a corresponding VCI/VPI (Virtual Path Identifier/Virtual Circuit Identifier) pair.

Once this configuration has taken place, users of the news reader PCs (H1 to H9) can subscribe to news articles about their chosen sport. Each news reader PC is controlled by a news reader program (installed on the computer from compact disc D3) which allows a user to select (using a Graphical User Interface for example) sports for which they would like to receive news articles held in the news computer N. On such a request being made the program controls the PC to send a request packet (FIG. 3) for news articles concerning the chosen sport to site-level forwarding computer (C1, C2, C3).

Figure 3:
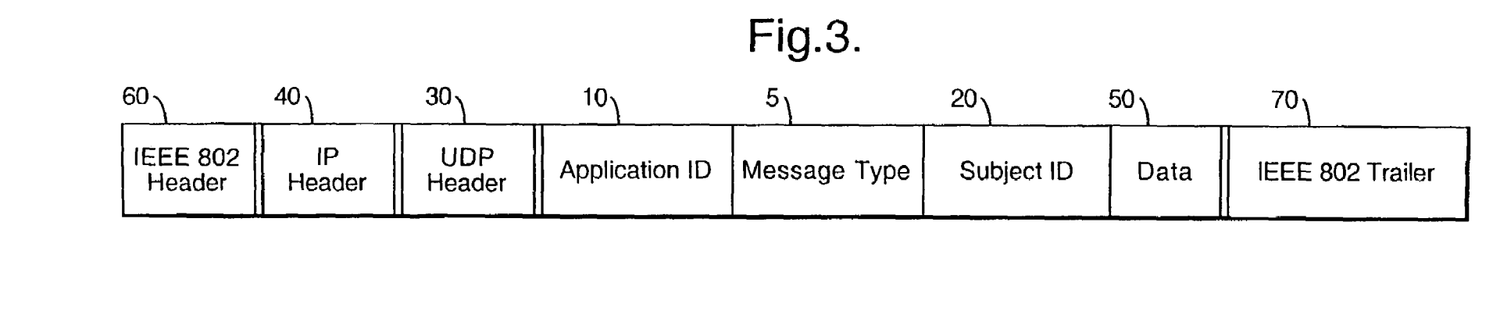
FIG. 3 shows the format of an application layer packet assembled in accordance with one embodiment of the present invention.

In the composition of the request packet, the news reader program controls the computer to provide data indicating that a file is sought 5, an indication that the files relates to a news application 10 and an identification of the subject 20 about which the news article is sought. The computer then operates in a conventional manner to successively add to the data: a UDP header 30, an IP header 40 and an IEEE 802 header 60 and trailer 70.

On receiving the request, the site-level application packet forwarding computer (C1, C2, C3) is controlled by a forwarding table updating program (installed on that computer from compact disc D2) to establish which of the on-site news reader PCs (H1 to H9) are now interested in news articles about the chosen sport. If the request is not already being met then the forwarding table is updated accordingly. Those skilled in the art will be able to generate suitable table updating program.

Figure 4A:
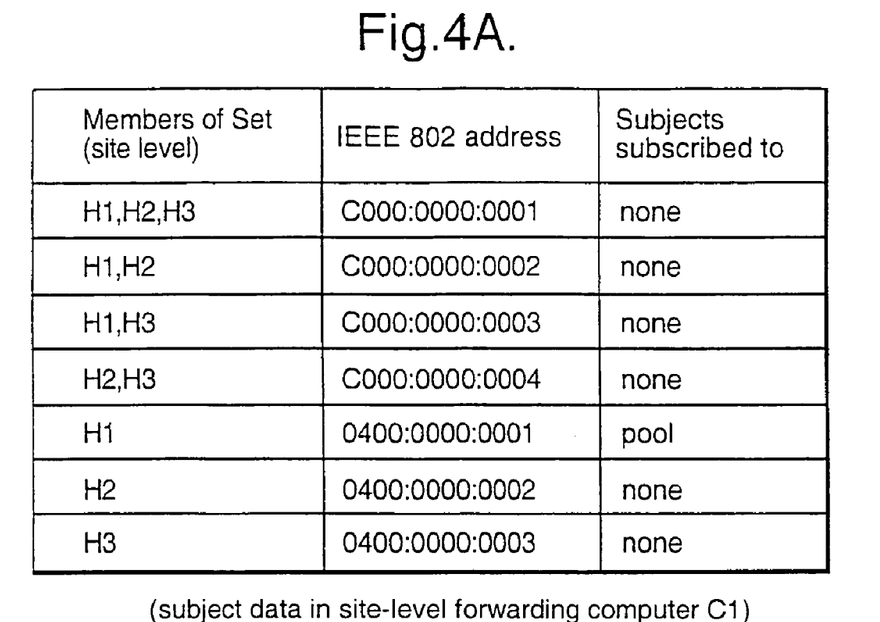
FIGS. 4A, 4B and 4C illustrate the building up of subject-to-address mappings used in the embodiment.

Were news reader PC H1 to send, for example, a 'subscribe' request for news articles concerning the subject 'pool', then the site-level forwarding computer operating under control of the program would update the forwarding table as shown in FIG. 4A. It will be seen that the subject 'pool' is associated with H1's unicast IEEE 802 address.

Once the table has been updated, the packet forwarding program controls the site-level application packet forwarding computer (C1, C2, C3) to check to see whether the forwarding computer (C1, C2, C3) already subscribes to the requested subject. If it does not then the site-level forwarding computer is further controlled to send a request to the organisation-level forwarding computer P.

On receipt of that request, the organisation-level forwarding computer P is controlled by a program similar to that described above in relation to the site-level forwarding computer (installed on the computer P from compact disc D1) to establish which set of the site-level forwarding computers (C1,C2,C3) now requires news articles concerning the selected subject to be sent. The organisation-level forwarding computer is then further controlled to update its forwarding table accordingly. Again programs to cause this operation can be easily generated by those skilled in the art.

Figure 4B:
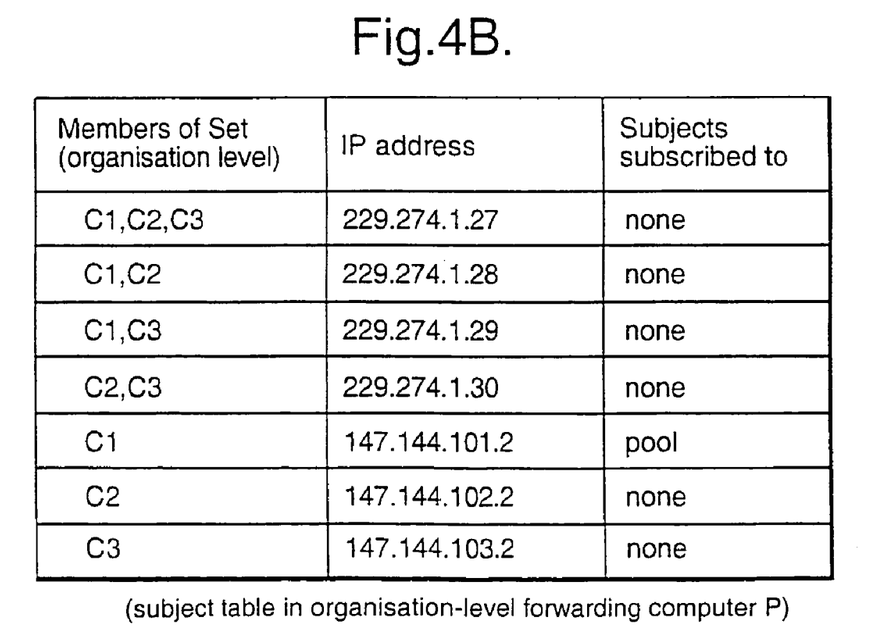

To continue with the earlier example, in response to the request from site-level application packet forwarding computer C1 for 'pool' articles, the organisation-level computer will update its forwarding table as shown in FIG. 4B. It will be seen that the forwarding table indicates that news articles concerning 'pool' are to be unicast to the IP address of site-level forwarding computer C1.

Figure 4C:
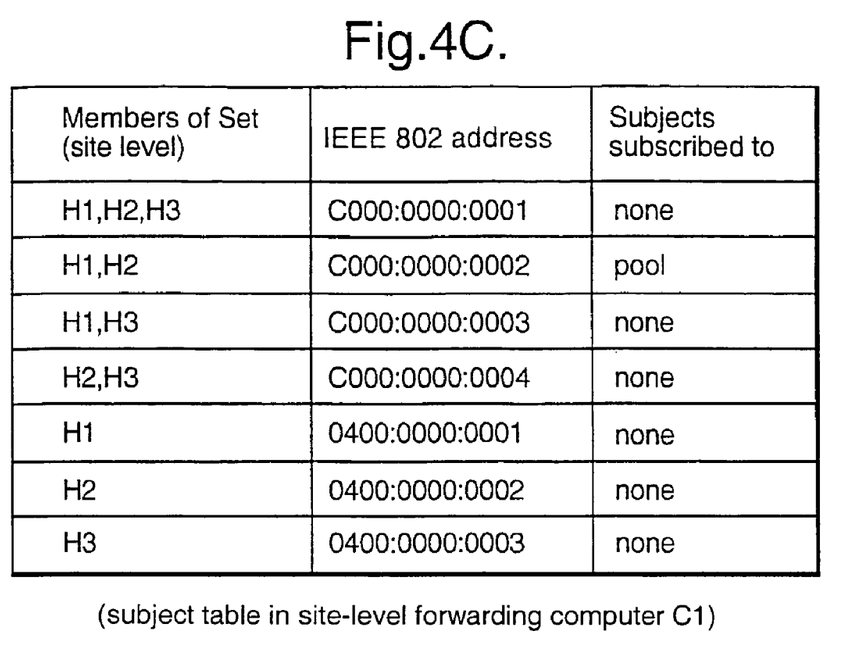

Using similar procedures to those described above, a request for articles relating to 'pool' might later be received by site-level forwarding computer C1 from news reader PC H2. The site-level packet forwarding computer C1 is therefore controlled to amend its forwarding table to reflect the fact that both news reader H1 and news reader H2 should be sent articles concerning 'pool'. The site-level forwarding computer will therefore update its forwarding table as shown in FIG. 4C.

It will be seen that as two news reader PCs (H1, H2) have now requested articles relating to a subject, the IEEE 802 address associated with the subject is a multicast address (in the notation generally used, IEEE 802 multicast addresses begin with the hexadecimal number C000 and IEEE 802 unicast addresses begin with hexadecimal number 0400).

It will be realised by those skilled in the art that 'unsubscribe' requests could also easily be implemented.

After a number of requests have been received from the various news reader PCs (H1 to H9) in the intranet, the forwarding tables will associate several subjects with each multicast or unicast address.

Figure 5A:
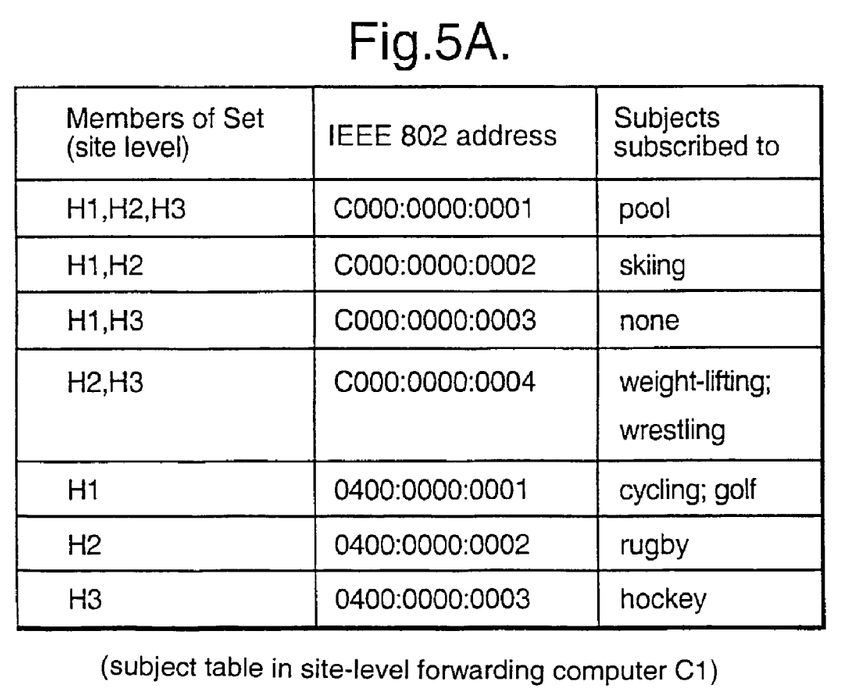
FIGS. 5A, 5B, 5C and 6 illustrate more developed subject-to-address mappings.
Figure 5B:
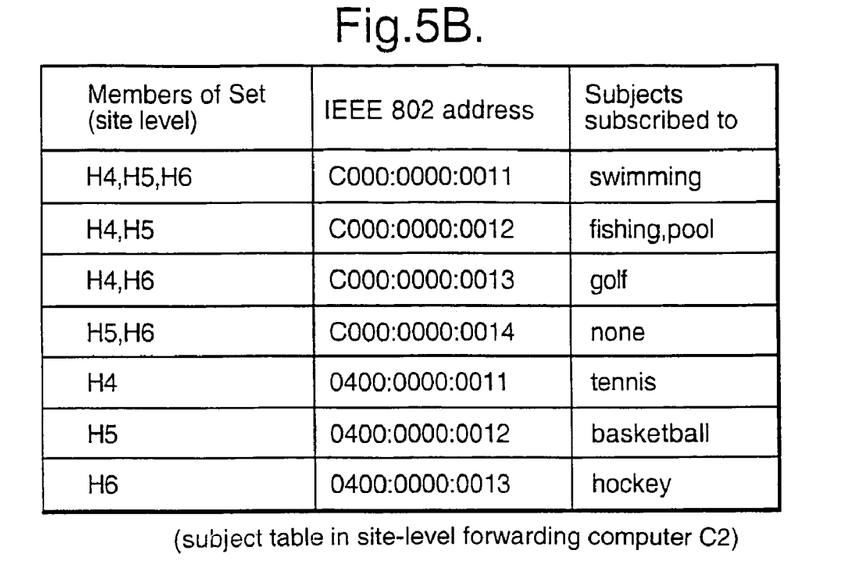
Figure 5C:
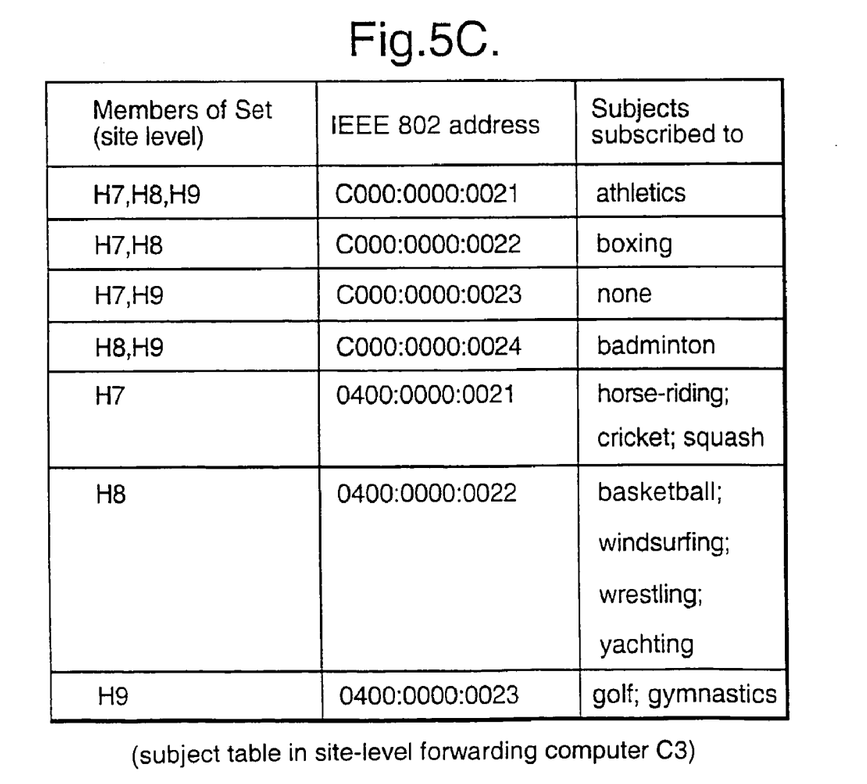
Figure 6:
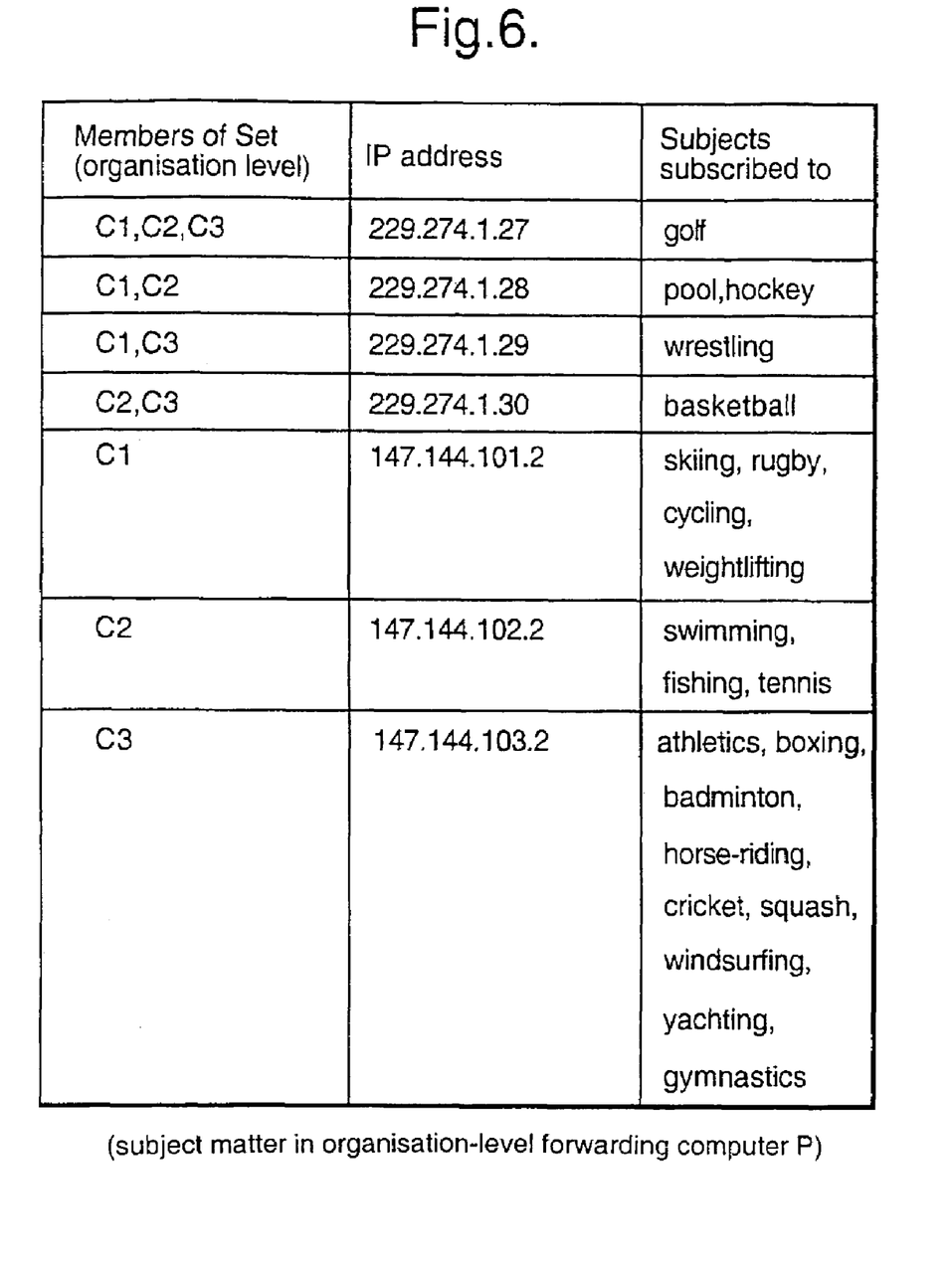

For example, the forwarding tables of site-level forwarding computers C1, C2 and C3 might be as shown in FIGS. 5A, 5B and 5C respectively. At the same time, the forwarding table associated with organisation-level forwarding computer P might be as shown in FIG. 6.

On receiving a news article, each of the site-level forwarding computers (C1,C2,C3) is controlled by the forwarding program to extract both the news article (FIG. 3, 50) and subject 20 from the payload of the incoming UDP protocol data unit and send another UDP protocol data unit containing the news article to the IEEE 802 address associated with the subject 20 in the table. Programs executable to control the forwarding computers to behave in this manner can be generated by those skilled in the art.

To give an example, were the organisation-level computer P to receive a new news article concerning 'golf' and were the forwarding tables to be as shown in FIGS. 5A, 5B, 5C and 6 then the organisation-level forwarding computer P would be controlled to send the packet to IP address 229: 274:1:27 (the multicast address corresponding to all three site-level forwarding computers (C1,C2,C3)). On receiving that packet the router R1 would fragment the IP packet and, in accordance with the routing table entries made at the configuration stage, send the fragments as a stream of ATM cells having a corresponding VPI/VCI pair as mentioned above. Once the packet arrives at the second site-level forwarding computer C2, that forwarding computer C2 is controlled to reassemble the IP packet, extract the subject information (golf) from its payload and forward the IP packet in an appropriately addressed IEEE 802 frame. The third line of FIG. 5B shows the associated IEEE 802 address. Owing to the earlier configuration stage, the network interface cards of the hosts H4 and H6 pass the packet to the appropriate news reader hosts (H4 and H6 in this case) and then process the packet to present the news item to the user.

By providing the forwarding computers with further programs, they could be rendered operable to allow efficient 'cross-posting'. 'Cross-posting' involves the sending of a message which concerns a plurality of subjects. The subject field of a forwarded packet might contain an identification of a pair of subjects, for example. It can be envisaged that the site-level forwarding computers (C1,C2,C3) could operate under control of the further program to identify the union of the sets of recipients for the two subjects and then forward the news item to the interested hosts. For example, assume the sets of recipients interested in various subjects are as shown in FIGS. 5A, 5B, 5C and 6, and that forwarding computer C1 has received a news item that relates to both hockey and golf. The forwarding computer can easily be programmed to determine that both H1 and H3 are interested in the news item and thereafter send the news item to the IEEE 802 address that corresponds to the group (H1,H3) namely C000:0000:0003.

Similarly, in relation to reliable multicast protocol, a further program could be used to control the forwarding computers to re-send messages only to the subset of recipients who did not acknowledge the message. Again, using the techniques of the above embodiment, the selection of an appropriate multicast/unicast address would be trivial.

In the above embodiment, the configuration of the network interface cards to pass appropriately addressed multicast frames to the news reader hosts H1 to H9 themselves is carried out manually. This configuration could be done automatically by having the site-level forwarding computers (C1,C2,C3) unicast configuration messages to the news reader hosts (unicast addresses are available from the configuration tables (e.g. the last three lines in FIG. 2A).

An alternative embodiment of the present invention does not have the site-level forwarding computers (C1, C2, C3). At the configuration stage the organisation-level forwarding computer P is provided with a directory that lists multicast addresses for each of the 500 or so possible sets of news reader PC recipients. It will be realised that such an embodiment requires the central router R1 to have routing table entries for all those addresses. However this still represents an improvement over conventional methods of using multicast which involve a multicast address being provided in relation to each subject to which a news item relates. The USENET service for example provides information on about 27,000 subjects. Hence, were a similarly comprehensive news service to be provided over the corporate intranet (FIG. 1) using conventional techniques the central router would require 27,000 entries in its multicast routing table. It will be seen how the use of a multicast directory enables this to be reduced to 500 multicast routing entries in this alternative embodiment.

However, the first-described embodiment reduces the number of multicast routing entries in the gateway router R1 even further. By arranging the corporate intranet as a hierarchy, with the ATM network A providing the upper level network and the site internetworks (S1,S2,S3) providing the lower level networks, the central router need only have as many multicast forwarding table entries as there are selections of lower level networks (in the above described embodiment only four multicast entries and three unicast entries need be stored in central router R1).

Hence, it will be seen how the use of a directory can reduce the burden on the intranet and how the use of multiple directories can reduce the burden on the network still further.

The above advantages are amplified in embodiments that have more than two hierarchical layers in the forwarding structure. For example, an embodiment can be envisaged in which town-level and country-level forwarding computers are used.

The above embodiment only enables the transmission of news articles from the news computer N to the news reader PCs (H1 to H9). A 'publish and subscribe' service could be provided by programming the news reader PCs (H1 to H9) to be operable to unicast messages containing news articles input by their users to the news computer N. These messages could then be sent back down the hierarchy as described above.

A yet further embodiment of the present invention is similar to the alternative embodiment mentioned above in that the site-level forwarding computers (C1,C2,C3) are not required. Nevertheless the number of multicast addresses handled by the network can be reduced without arranging the network into a hierarchy. To do this the central forwarding computer P is provided with a separate directory for each of the internetworks (S1,S2,S3). It will be realised that each of those directories will only require four multicast addresses.

More complex arrangements which are effective to obviate the need to send messages to the news computer at the top of the hierarchy might also be used.

In other embodiments many different applications might be supported. For example, by replacing the subject field of the above embodiment with a field that indicated both an application and a subject, the embodiment could support a plurality of subject-based applications. One such application is the announcement of multicast sessions. Session announcement could include a subject identifier similar to that currently seen in Network News applications (e.g. comp.internet.ietf.conference). It will be clear how the above embodiment might be altered to allow a user to selectively receive only those announcements which concern subjects in which he is interested. Such a facility could be provided instead of or in addition to the 'push' news service described above.

What is claimed is:

1. A method of operating a transmitter to transmit a data block to a plurality of recipients selected from a plurality of receivers connected to said transmitter via a multicast-capable network, wherein said transmitter has access to one or more directories storing a plurality of lists of receiver identifiers and a multicast-address suitable for use in said multicast-capable network corresponding to each of said lists; said method comprising the steps of:
   a) obtaining a list of receiver identifiers, said list corresponding to the set of recipients to which said data block is to be sent;
   b) after receiving said data block, said data block being without a corresponding multicast address, examining said one or more directories to find and obtain a multicast-address corresponding in common to said list of receiver identifiers obtained in step a);
   c) addressing said data block to said multicast address found and obtained in step b); and
   d) transmitting said data block over said multicast-capable network, the data block being addressed with said multicast address in step c).

2. A method according to claim 1 wherein:
said obtaining step comprises:
   a) receiving one or more indications that an earlier data block addressed to a selected set of receivers was not successfully received by one or more of said set of receivers; and
   b) analysing said indications to generate a list of receiver identifiers, each receiver identifier in said list identifying a recipient that did not successfully receive said earlier data block.

3. A method according to claim 1 wherein:
said obtaining step involves:
   a) determining that a general data block is to be sent to recipients included in one or more of a selected plurality of said lists; and
   b) unifying said selected plurality of lists to find a unified list of receiver identifiers.

4. A method according to claim 1 wherein said transmitter further has access to type data listing data block type identifiers, and a list of recipient identifiers for each data block type identifier, wherein said obtaining step involves:
   a) finding a type identifier associated with said data block; and
   b) examining said type data to find a list of receiver identifiers associated with said type identifier.

5. A method according to claim 4 wherein said type identifier is a subject-matter identifier indicating the subject-matter to which the data in the data block relates.

6. A method according to claim 4 wherein said type identifier finding step involves extracting a type identifier from a data block received at said transmitter.

7. A method according to claim 1 wherein said transmitter has access to a plurality of group directories for respective groups of receivers.

8. A method according to claim 1 wherein the format of said multicast address is in accordance with the Internet Protocol suite.

9. A program storage device readable by a processing apparatus, said device embodying a program of instructions executable by the processing apparatus to perform method steps for transmitting a data block over a network to a set of recipients selected from a plurality of receivers, said method steps comprising steps according to claim 1.

10. A transmitter operable to transit data blocks to a set of recipient computers selected from a plurality of receiver computers connectable to said transmitter computer via a multicast-capable network, said transmitter comprising:
   an output connectable to said multicast-capable network;
   one or more processors;
   a program store storing instructions executable by said one or more processors to transmit the data block via said output over said multicast-capable network; and
   one or more directories for storing a plurality of lists of receiver identifiers and a multicast-address suitable for use in said multicast-capable network corresponding to each of said lists;
   said instructions being executable by said one or more processors to transmit the data block by:
   a) obtaining a list of receiver identifiers, said list corresponding to the set of recipients to which said data block is to be sent;
   b) after receiving said data block, said data block being without a corresponding multicast address, examining said one or more directories to find and obtain a multicast address corresponding in common to said list of receiver identifiers obtained in step a);
   c) addressing said data block to said multicast address found and obtained in step b); and
   d) transmitting said data block over said network, the data block being addressed with said multicast address in step c).

11. A transmitter according to claim 10 wherein:
   said transmitter further has access to type data listing data block type identifiers, and a list of recipient identifiers for each data block type identifier; and
   said set of instructions being further executable to obtain said list of receiver identifiers by:
   a) finding a type identifier associated with said data block; and
   b) examining said type data to find a list of receiver identifiers associated with said type identifier.

12. A computer program product containing computer readable medium encoded with program instructions for operating a transmitter to transmit a data block to a plurality of recipients selected from a plurality of receivers connected to said transmitter via a multicast-capable network, wherein said transmitter has access to one or more directories storing a plurality of lists of receiver identifiers and a multicast-address suitable for use in said multicast-capable network corresponding to each of said lists, the computer program product comprising:
   a) computer readable program code means for causing a computer to obtain a list of receiver identifiers, said list corresponding to the set of recipients to which said data block is to be sent;
   b) computer readable program code means for causing the computer to, after receiving said data block, said data block being without a corresponding multicast address, examine said one or more directories to find and obtain a multicast-address corresponding in common to said obtained list of receiver identifiers;
   c) computer readable program code means for causing the computer to address said data block to said found and obtained multicast address; and
   d) computer readable program code means for causing the computer to transmit said data block over said multicast-capable network, the data block being addressed with said multicast address.

* * * * *